(12) United States Patent
Lovell (10) Patent No.: US 12,510,210 B2
(45) Date of Patent: Dec. 30, 2025

(54) CONTROL SYSTEM FOR REDUCED EMISSIONS

(71) Applicant: Fisher Controls International LLC, Marshalltown, IA (US)

(72) Inventor: Michel K. Lovell, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 247 days.

(21) Appl. No.: 18/464,665

(22) Filed: Sep. 11, 2023

(65) Prior Publication Data

US 2025/0084877 A1    Mar. 13, 2025

(51) Int. Cl.
*F17D 1/02* (2006.01)
*F16K 15/18* (2006.01)
*F17D 3/01* (2006.01)

(52) U.S. Cl.
CPC .............. *F17D 1/02* (2013.01); *F16K 15/184* (2021.08); *F17D 3/01* (2013.01)

(58) Field of Classification Search
CPC . F15B 21/001; F17D 1/02–04; G05D 7/0635; G05D 16/2097; G05D 16/166; Y10T 137/777
See application file for complete search history.

(56) References Cited

U.S. PATENT DOCUMENTS

| | | | | |
|---|---|---|---|---|
| 4,420,950 A | * | 12/1983 | Bodas | F02C 7/143 62/305 |
| 5,372,010 A | * | 12/1994 | Gratz | F17D 1/04 165/45 |
| 6,056,004 A | * | 5/2000 | Agnew | F16L 55/00 60/785 |

(Continued)

FOREIGN PATENT DOCUMENTS

TW      200933037 A  *  8/2009  ............. F04D 17/12

OTHER PUBLICATIONS

Emerson Automation Solutions, EZH and EZHSO Series Pressure Reducing Regulators, https://www.emerson.com/documents/automation/data-sheets-ezh-ezhso-series-pressure-reducing-regulators-bulletin-fisher-en-en-5903256, Bulletin 71.2, Jul. 2023, printed Feb. 8, 2024, 28 pages.

(Continued)

*Primary Examiner* — Marina A Tietjen
(74) *Attorney, Agent, or Firm* — Quarles & Brady LLP (57) ABSTRACT

A fluid control system is provided for controlling flow of a process fluid through a pipeline. In one example, the pipeline can include a valve that defines an upstream and a downstream portion of the pipeline. The system can include one or more instruments configured to control operation of the valve. In one example, the system can include a compressor and an expander configured to selectively receive supply gas from the upstream portion of the pipeline via a supply line. In one example, supply gas flows to the com- (Continued)

pressor and the expander via the supply line when a differential pressure between the upstream and downstream portions of the pipeline is below a predetermined threshold and does not flow to the compressor and expander when the differential pressure between the upstream and downstream portions of the pipeline is above a predetermined threshold.

20 Claims, 3 Drawing Sheets

(56) References Cited

U.S. PATENT DOCUMENTS

| | | | |
|---|---|---|---|
| 2010/0003147 A1* | 1/2010 | Takahashi | F04C 23/008 418/83 |
| 2019/0041124 A1* | 2/2019 | Berti | F25B 11/04 |
| 2024/0011673 A1* | 1/2024 | Ueda | F04D 25/16 |

OTHER PUBLICATIONS

Emerson Automation Solutions, Fisher Fieldvue DVC6200 Digital Valve Controller, https://www.emerson.com/documents/automation/instruction-manual-fieldvue-dvc6200-hw2-digital-valve-controller-en-123052.pdf, Instruction Manual, Dec. 2022, printed Feb. 8, 2024, 108 pages.

VRG Controls, LLC, RCVC Red Circle Valve Controller, Platinum Natural Gas Solutions, https://static1.squarespace.com/static/5b1ea318710699a445e16ebe/t/60b9265415017769e5590b9e/1622746713798/VRG+Controls+-+RCVC+Red+Circle+Valve+Controller+PtNGS.pdf, date unknown, printed Feb. 8, 2024, 23 pages.

Baker Hughes, Becker DNGP Digital Natural Gas Positioner brochure, https://dam.bakerhughes.com/m/1494acde68f0e979/original/Becker-DNGP-Brochure-English.pdf, 11/20, printed Feb. 8, 2024, 8 pages.

Baker Hughes, Becker Valve Regulator Pilot, https://valves.bakerhughes.com/beckerbecker-productsvalve-regulator-pilot-becker, printed Feb. 8, 2024, 3 pages.

Air Squared Scroll Technology, Scroll Expander Produces 1kW of Quiet Power, https://airsquared.com/news/scroll-expander-produces-1-kw-of-quiet-power/, printed Feb. 8, 2024, 4 pages.

Harada, Kevin J., Abstract of the Thesis "Development of a Small Scale Scroll Expander", Presented Sep. 27, 2010, 141 pages.

* cited by examiner

CONTROL SYSTEM FOR REDUCED EMISSIONS

CROSS-REFERENCE TO RELATED APPLICATION

Not applicable.

BACKGROUND

Fluid control systems can be used in a variety of industrial, commercial, and other settings to regulate, protect, isolate, or maintain pipes, conduits, or other vessels and the flow of fluid therein (e.g., within a pipeline). In some applications, it may be useful to manage or control fluid flow in pipeline where certain power sources are unavailable. However, typical control systems often vent a portion of the process fluid (e.g., pipeline gas), which can result in loss of valuable material (e.g., natural gas), and may incur regulatory consequences.

SUMMARY

Some embodiments of the invention provide a fluid control system for controlling flow of a process fluid through a pipeline. In one example, the pipeline can include a valve that defines an upstream and a downstream portion of the pipeline. The system can include one or more instruments configured to control operation of the valve. In one example, the system can include a compressor and an expander configured to selectively receive supply gas from the upstream portion of the pipeline via a supply line. In one example, supply gas flows to the compressor and the expander via the supply line when a differential pressure between the upstream and downstream portions of the pipeline is below a predetermined threshold and does not flow to the compressor and expander when the differential pressure between the upstream and downstream portions of the pipeline is above a predetermined threshold.

Some embodiments of the invention provide a fluid control system for controlling flow of a process fluid through a pipeline. The fluid control system can include a valve defining an upstream portion and a downstream portion of the pipeline and a supply line connected to the upstream portion of the pipeline. In one example, the supply line is configured to provide supply gas to one or more instruments configured to control the valve. In another example, the supply line is configured to supply gas to a compander when a differential pressure between the upstream portion and the downstream portion of the pipeline is below a predetermined threshold. In one example, the compander may be arranged to provide pressurized supply gas to the one or more instruments. In one example, the supply line is configured to directly provide supply gas to the one or more instruments via a bypass line when the differential pressure is above the predetermined threshold.

Some embodiments of the invention provide a method of controlling flow through a pipeline via a valve that defines an upstream portion and a downstream portion of the pipeline. In one example, the method may include selectively directing supply gas from the upstream portion of the pipeline via a supply line to a compressor and an expander configured to power the compressor. In one example, the compressor may operate to provide pressurized supply gas to control operation of the valve. In one example, supply gas may be directed to the compressor and the expander via the supply line when a differential pressure between the upstream portion of the pipeline and a downstream portion of the pipeline is below a predetermined threshold.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

The following discussion is presented to enable a person skilled in the art to make and use embodiments of the invention. Given the benefit of this disclosure, various modifications to the illustrated embodiments will be readily apparent to those skilled in the art, and the principles herein can be applied to other embodiments and applications without departing from embodiments of the invention. Thus, embodiments of the invention are not intended to be limited to embodiments shown, but are to be accorded the widest scope consistent with the principles and features disclosed herein.

The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As briefly discussed above, fluid control systems can be used in a variety of industrial, commercial, and other settings to control fluid flow through pipes, conduits, or other vessels. For example, some process systems, including off-shore drilling wells, oil fields, natural gas transmission pipelines, etc. may (occasionally) require valve actuation at remote or difficult to access sites. Such remote sites may lack a reliable power source, or may otherwise be sometimes subject to power loss events, and thus would benefit from systems for valve actuation without outside power sources, and without unnecessary loss of fluid (e.g., natural gas).

Embodiments of the invention can provide a fluid control system configured to enable operation of one or more instruments with supply gas from a pipeline (or other similar process fluid), with zero emission of the supply gas to atmosphere in some cases. Some examples, in particular, can be configured to power pneumatic instruments for operation of pipeline valves (or other equipment) with supply gas, including when the relevant pipeline provides a relatively small differential pressure (dP). Accordingly, for example, pipeline valves can be controlled at unpowered locations using process fluid, and the fluid control system can vent of process fluid (e.g., instrument gas) back into the pipeline, without loss of the fluid to the atmosphere.

Generally, a compressor and an expander can be provided, with process fluid routed to each to provide a self-contained powered system. In one example, the fluid control system includes a compander, including a compressor and an expander configured to power the compressor. In one example, the compander is powered via process fluid from a pipeline. The compressor can be configured to pressurize the supply gas to increase pressure of the process fluid, which enables operation of the instruments even in situations with minimal differential pressure between upstream and downstream portions of the pipeline. In one example, process fluid from an upstream portion of the pipeline is drawn from the pipeline via a supply line to power the expander, which is mechanically coupled to the compressor to power the compressor. Thus, the compressor can compress the supply gas to provide at least a predetermined differential pressure value that is sufficient for operation of pneumatic instruments and reinjection of the spent gas from the instruments into the pipeline.

Figure 1:
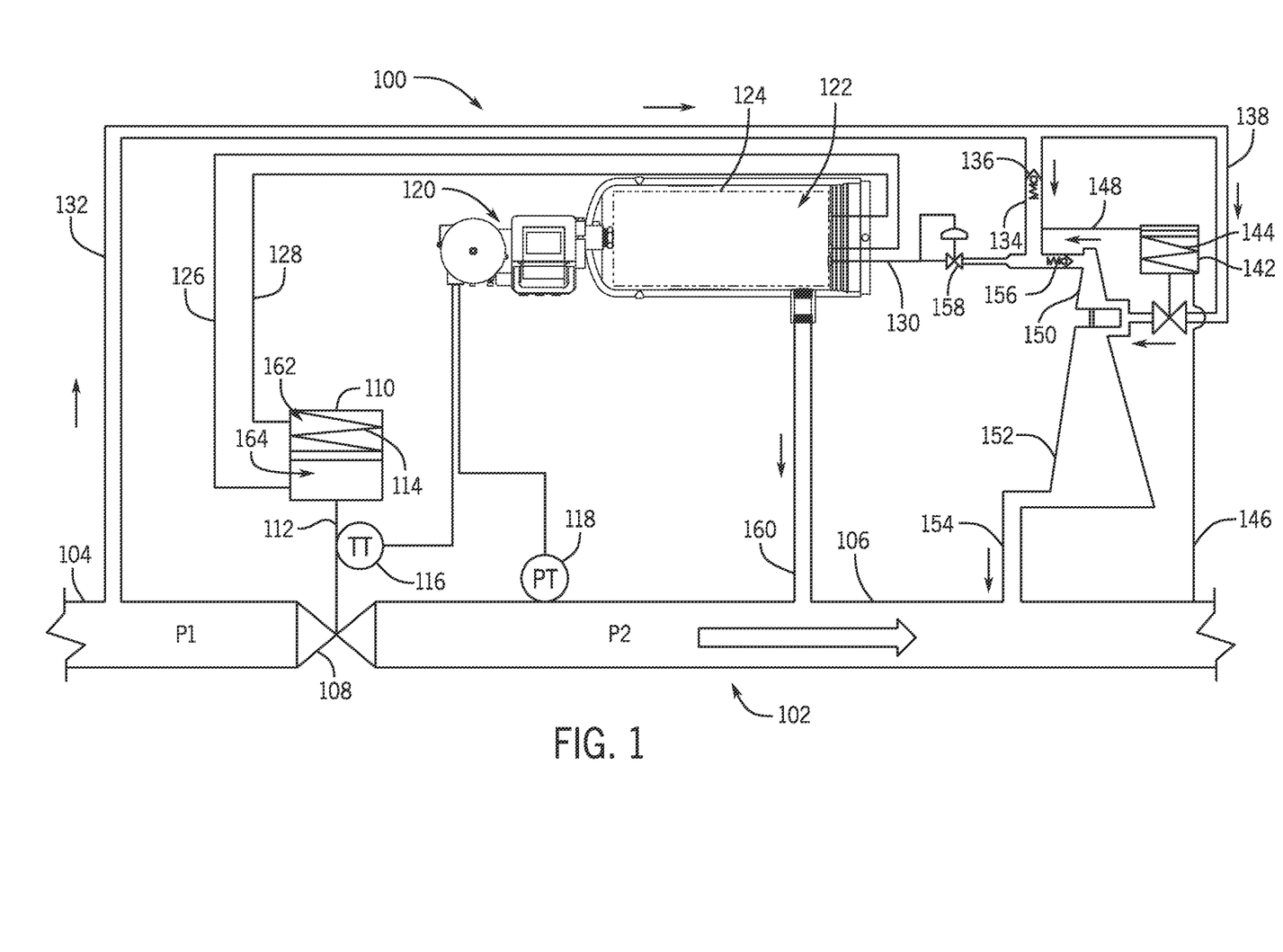
FIG. 1 is a schematic view of a pipeline including an example control system according to aspects of the present disclosure.

FIG. 1 illustrates an example of a fluid control system 100. In one example, the fluid control system 100 may be used on a pipeline 102. The pipeline 102 may be a natural gas pipeline or otherwise arranged to carry process fluid. In one example, the pipeline 102 may include a valve 108 arranged to control fluid flow rate or pressure drop between an upstream portion 104 (with respect to valve 108) and a downstream portion 106 (with respect to valve 108) of the pipeline 102. The valve 108 may be any of a variety of known types, e.g., a ball valve, gate valve, butterfly valve, diaphragm valve, globe valve, plug valve, check valve, or any other form of valve used to modify pipeline pressure or flow.

In the illustrated example, the valve 108 may be stroked (i.e., moved/actuated) via an actuator 110 to close, open, or otherwise adjust a position of a valve stem 112 of the valve 108. Thus, through control of the actuator 110, the valve 108 can be controlled to generate a particular pressure drop across the valve 108 or a particular flow rate of fluid into the downstream portion 106 of the pipeline 102. In one example, the actuator 110 may be a double acting piston type actuator. In another example, the actuator may be a single acting piston type actuator, or may have other known configurations. In some examples, the actuator may include a biasing element 114 (e.g., spring) configured to cause the actuator to be "fail-closed" (e.g., when there is insufficient pressure to operate the actuator 110). In other examples, the biasing element 114 may be configured to cause the actuator to "fail-open" in certain situations.

In one example, the fluid control system 100 includes a fluid-powered instrument assembly 124 (e.g., pneumatic (i.e., gas-operated) instruments of various known configurations) arranged to control operation of the valve via control of the actuator 110. In one example, one or more pneumatic instruments can operate via the use of instrument gas (e.g., supply gas regulated to a predetermined differential pressure value), which may be routed from the upstream portion 104 of the pipeline via a supply line 132 and re-injected into the downstream portion 106 of the pipeline 102 after use (as further detailed below). As mentioned previously, the instrument assembly 124 may require a predetermined differential pressure in order to operate the instruments to adjust the actuator 110. In some situations, including when the valve 108 is fully open, there may be insufficient differential pressure between the upstream portion 104 and the downstream portion 106 to operate the instrument assembly 124 (and the actuator 110). Thus, to increase the pressure of the instrument gas, a compressor 150 is arranged within the control system 100.

The compressor 150 may be configured to pressurize the supply gas, as selectively received from the supply line 132, to a predetermined value to provide sufficient differential pressure to operate the actuator 110. Further, as also generally noted above, the compressor 150 may supply the instrument gas at sufficient pressure such that the gas can flow back into the pipeline 102 once exhausted by the instrument assembly 124. Supply gas can be selectively provided to the compressor 150, for example, by control of one or more valves in fluid communication with the compressor 150 (e.g., by operation of a regulator arrangement between the compressor 150 and the pipeline 102, including as further described below).

In one example, the compressor 150 may be a pneumatically driven compressor, e.g., a scroll compressor. However, various other known forms of compressor may be suitable in some examples.

In one example, the compressor 150 is powered by supply gas that is routed through an expander 152 to generate work sufficient to power the compressor 150. In some cases, supply gas can be selectively routed to the expander similarly to the compressor 150 (see above), including in parallel streams branching from a common supply line. In some cases, supply gas can be selectively routed to the expander 152 simultaneously with the compressor 150 (e.g., with a common regulator arrangement, including as further described below).

In one example, the combination of the compressor 150 and the expander 152 may be configured as a compander, including as illustrated in FIG. 1. In other words, the compressor 150 can be mechanically coupled to the expander 152 so that expansion of the supply gas through the expander 152 provides rotational power to compress the supply gas through the compressor 150. In some examples, a compander can be configured as a unitary assembly, with integrated housings, support structures, or other common features.

To prevent the loss of process fluid through the expander 152, the expander may be connected to the downstream portion 106 of the pipeline 102 via a vent 154, which expels supply gas from the expander 152 into the downstream portion 106 of the pipeline 102. Thus, the expander 152 can be sized or otherwise configured so that supply gas expelled from the expander may be at a sufficient pressure to re-inject into the downstream portion of the pipeline (i.e., a pressure greater than or equal to P2). In one example, the expander 152 may be a large volume expander and the compressor 150 may be a small volume compressor, which provides a total pressure ratio of 20:1 (i.e., 20 psi of compression for 1 psi of expansion). In other examples, other pressure ratios can be provided.

In one example, pressure of the process fluid from the upstream portion 104 of the pipeline 102 can be regulated to a predetermined value (e.g., with a regulator) arranged along the supply line 132. In one example, pressure of the process fluid can be sensed to control operation of the compressor 150 and the expander 152. For example, a differential pressure regulator 142 can be arranged to reference the pressure in the downstream portion of the pipeline (e.g., pressure (P2)) via a first reference line 146 and to reference the pressure at the compressor output via a second reference line 148. If the pressure at the compressor output is higher than a particular value, the regulator 142 closes. This directs supply gas from the pipeline 102 to flow through a bypass line 134 (overcoming check valve 136), i.e., provides instrument gas to an input line 130 of the instrument assembly 124 without pressurization by the compressor 150. In particular, the regulator 142 can be configured to ensure that a pressure provided to the input line 130 (as provided via flow through the compressor 150) is high enough so instrument gas can be reinjected into the pipeline 102 after experiencing the operational pressure drop of the instrument assembly 124. In other words, for example, the regulator 142 can be set to ensure that the compressor 150 operates to ensure a pressure that exceeds P2 by at least the operational pressure drop of the instrument assembly 124 (plus any desired safety factor or accommodation for other expected pressure drops).

In one example, the input line 130 may include a regulator 158 (e.g., a high-pressure regulator) configured to the regulate the pressure in the input line 130 to ensure a sufficient (e.g., predetermined) pressure for operation of the one or more instruments and reinjection of the gas into the pipeline 102. For example, the regulator 158 can be set to provide, to a pressurized chamber, a flow of instrument gas that is sufficiently high for operation of a pneumatic control system (with an operational dP) and reinjection of the spent instrument gas into the pipeline 102 without further pressurization.

If the pressure at the compressor output is instead lower than the relevant set pressure, the regulator 142 opens, which allows supply gas to flow through a compressor input line 138 to both the compressor 150 and the expander 152 (e.g., a unitary compander). As mentioned previously, the expander 152 generates work via the expansion of the supply gas to power the compressor 150, which pressurizes the supply gas for operation of the instrument assembly 124. Additionally, gas moving through the expander (e.g., after expansion) is directed into the downstream portion 106 of the pipeline 102 via the vent 154 to prevent loss of supply gas to the atmosphere. Instrument gas leaving the compressor 150 (overcoming check valve 156) backfills the bypass line 134, which closes check valve 136 and directs instrument gas into the input line 130 as discussed previously. In one example, the regulator 142 may include a biasing element 144, e.g., a spring configured to cause the regulator to "fail-open." In other words, the regulator 142 can be configured to by default enable flow of supply gas through the compressor 150 and the expander 152 during certain failure events as well as during periods of low differential pressure in the pipeline 102.

Put differently, if the pressure at the output of the compressor 150 is above the pressure in the downstream portion of the pipeline (e.g., P2) plus a required pressure differential (and any safety factor, etc.), the regulator 142 closes and enables a flow of supply gas through the bypass line 134 into the instrument assembly 124. Thus, for example, via the connection of the check valve 136 along the bypass line 134, if P1 is sufficiently high relative to P2, the instrument assembly 124 can be operated solely via flow of supply gas through the bypass line 134. However, if the pressure at the output of the compressor 150 is below the relevant set pressure (as discussed above) the regulator 142 opens and enables a flow of supply gas through the compressor 150 and the expander 152 to increase the pressure available the instrument assembly 124 and also prevent flow of supply gas from the supply line 132 through the bypass line 134 (e.g., by closing the check valve 136).

In some examples, the fluid control system 100 can function in a zero-emission state, meaning that the system 100 exhibits no loss of gas (e.g., pipeline gas, instrument gas, supply gas) to the atmosphere while operating and while idle. As should be appreciated, this configuration can help to prevent loss of valuable material (e.g., via loss of gas) and avoidance of release events that may incur reporting requirements or other regulatory consequences (e.g., relating to venting of natural gas to atmosphere).

In the illustrated example, to accomplish this zero-emission state, one or more of the instruments (e.g., positioners, relays, regulators, volume boosters, trip valves, etc.) of the instrument assembly 124 that are used to control operation of the valve 108 are contained within a pressurized chamber 122 (e.g., as provided using known types of pressure vessels or other pressure-containment structures). Accordingly, the control system 100 can operate to float (or dynamically adjust) an internal pressure of the chamber 122 to match or exceed a pressure (P2) in the downstream portion 106 of the pipeline 102. In particular, as further discussed above, the control system 100 can be configured to operate the compressor 150, as needed, ensure appropriate input pressure to the instrument assembly 124 so that fluid exhausted by the instrument assembly 124 is of sufficiently high pressure to be reinjected (without further compression) into the downstream portion 106.

Put differently, the pressurized chamber 122 of the control system 100 can be a closed system with respect to the atmosphere. Thus, instead of referencing the atmospheric pressure, the instruments inside of the chamber 122 can instead reference the pressure in the downstream portion 106 of the pipeline 102. Thus, any gasses vented or otherwise lost from the control system 100 can be reinjected into the downstream portion 106 of the pipeline 102 via vent 160 (e.g., a simple plumbed connection), without further pressurization (and corresponding power requirements). Similarly, the flow of gas between the chamber 122 and the downstream portion 106 of the pipeline 102 via the vent 160 enables the chamber 122 and the downstream portion 106 of the pipeline 102 to reach an equilibrium, with the chamber (and instrument reference) pressure changing based on the pressure in the downstream portion 106 of the pipeline 102.

In one example of operation of the control system 100, the instrument assembly 124 communicates with one or more electronics, e.g., a controller 120. The controller 120 is configured to monitor the position of the actuator 110 and the pressure in the downstream portion 106 of the pipeline 102 to determine if adjustment of the valve 108 is needed. In one example, the controller 120 is positioned outside of the chamber 122 (i.e., exposed to/referenced to atmospheric pressure). In one example, the controller 120 is electrically (e.g., hardwired or wirelessly) connected to a pressure transducer 118 and a travel transducer 116. The pressure transducer 118 is configured to monitor and report the pressure (P2) in the downstream portion 106 of the pipeline 102. The travel transducer 116 is configured to monitor and report the position of the actuator 110 (corresponding to a position of the valve 108). In one example, the pressure transducer 118 is positioned outside of the pressurized chamber 122, to provide a gauge pressure reading of the downstream portion 106 (with respect to atmospheric pressure).

In one example, the instrument assembly 124 is connected to a first line 126 and a second line 128. In the example illustrated, instrument gas flow from the instrument assembly 124 into the second line 128 supplies gas to a second side 162 of the actuator 110, which restricts gas flow through the valve 108 (e.g., closes valve 108). Similarly, instrument gas flow into the first line 126 supplies gas to a first side 164 of the actuator 110, which increases gas flow through the valve 108 (e.g., opens valve 108). Throughout the valve actuation process, the controller 120 may monitor the pressure transducer 118 and travel transducer 116. During such actuation, as also discussed above, any working gas that vented from the instruments is captured within the chamber 122 and vented into the downstream portion 106 of the pipeline via the vent 160. Thus, the control system 100 operates in a zero-emission state, without loss of gas to the atmosphere.

Figure 2:
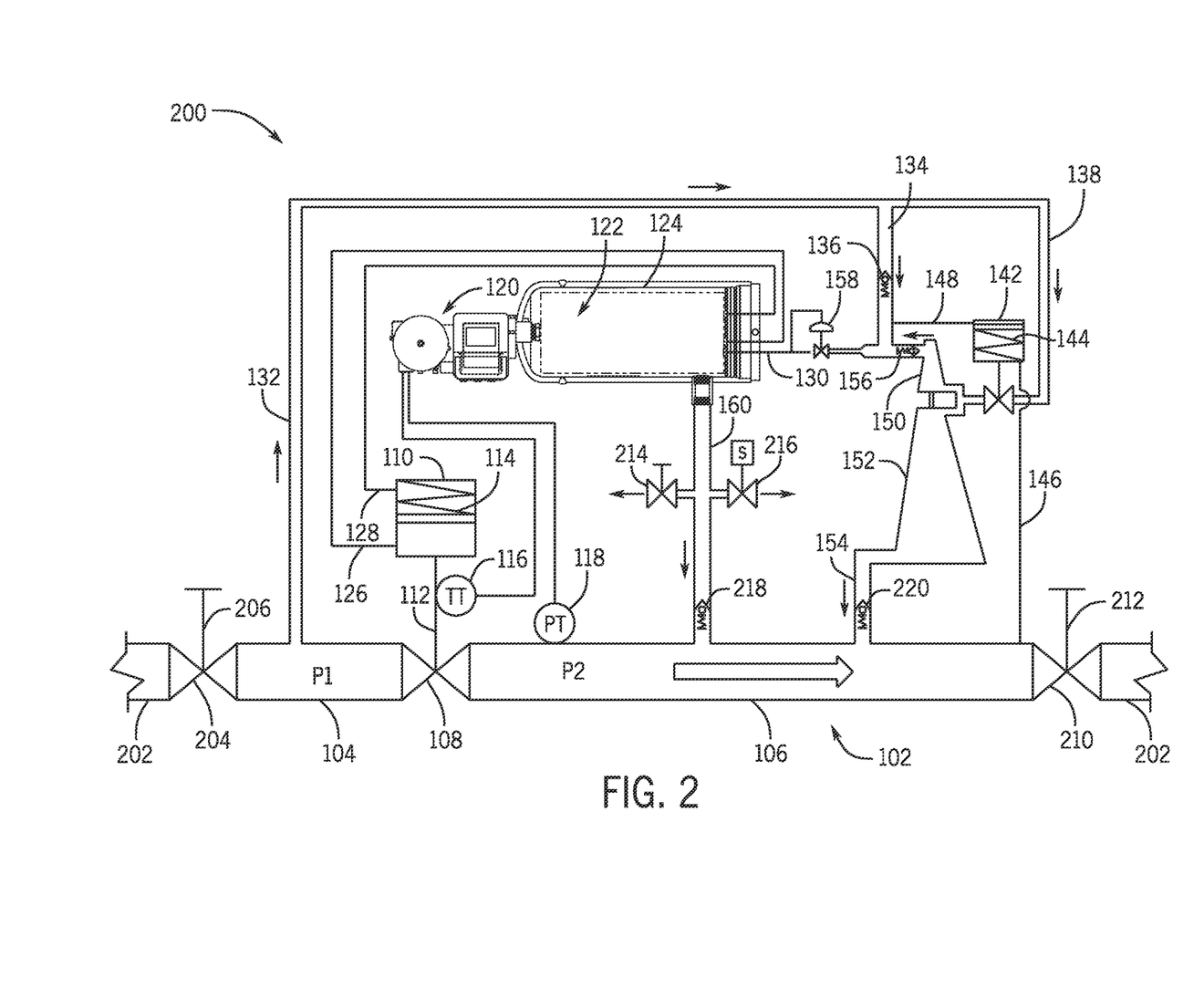
FIG. 2 is a schematic view of the pipeline of FIG. 1 including another configuration of the example control system.

FIG. 2 illustrates another example of a fluid control system 200 that can be used pipeline 102 of FIG. 1 (e.g., as an alternative configuration of the fluid control system 100). As will be recognized, the fluid control system 200 shares a number of components in common with and operates in a similar fashion to the examples illustrated and described previously. For the sake of brevity, these common features will not be again described below in detail. Rather, previous discussion of commonly named or numbered features, unless otherwise indicated, also applies to example configurations of the control system 200.

In some cases, an operator may desire to isolate a portion of the pipeline 102. For example, a portion of the pipeline may be isolated to enable maintenance and/or replacement of a section of the pipeline 102. To enable the operator to isolate a portion of the pipeline 102, the pipeline may include a set of isolation valves 204, 210. The isolation valves 204, 210 may be operated by a user in order to fluidically isolate the upstream portion 104 and the downstream portion 106 from a remainder 202 of the pipeline 102. In one example, the isolation valves 204, 210 are manual valves each including a manually operable valve stem 206, 212 configured to be actuated by a user or operator. In other examples, the isolation valves 204, 210 may be any other forms of valves.

As should be appreciated, closing of the isolation valves 204, 210 can eliminate the flow of process gas through the isolated portion (e.g., the upstream portion 104 and the downstream portion 106). As a result, the valve 108 may be rendered inoperable due to lack of pressure drop between the upstream and downstream portions 104, 106 of the pipeline 102. Further, the corresponding lack of flow may prevent operation of the compressor 150 and expander 152 (i.e., compander) to generate differential pressure.

To enable operation of the valve 108, the fluid control system 200 can thus include one or more vent valves, e.g., a manual vent valve 214 and a solenoid powered vent valve 216. In one example, the system 200 may include only the manual valve 214, only the solenoid valve 216, any other form of vent valve, or any combination thereof. To enable operation of the valve 108, the vent valve 214 or the vent valve 216 may be opened, which vents the pressurized gas within the chamber 122 and enables the instrument assembly 124 to reference atmospheric pressure as opposed to downstream pipeline pressure (e.g., P2). Thus, sufficient differential pressure may be generated relative to the upstream portion 104 to at least temporarily commission, test, or otherwise operate the valve 108. To prevent backflow of gas from the downstream portion of the pipeline 102 a set of check valves 218, 220 are arranged on the vents 154, 160. In one example, a flow meter may be positioned downstream of the vent valves 214, 216 (or otherwise) to document a volume of gas emitted during the operation.

Figure 3:
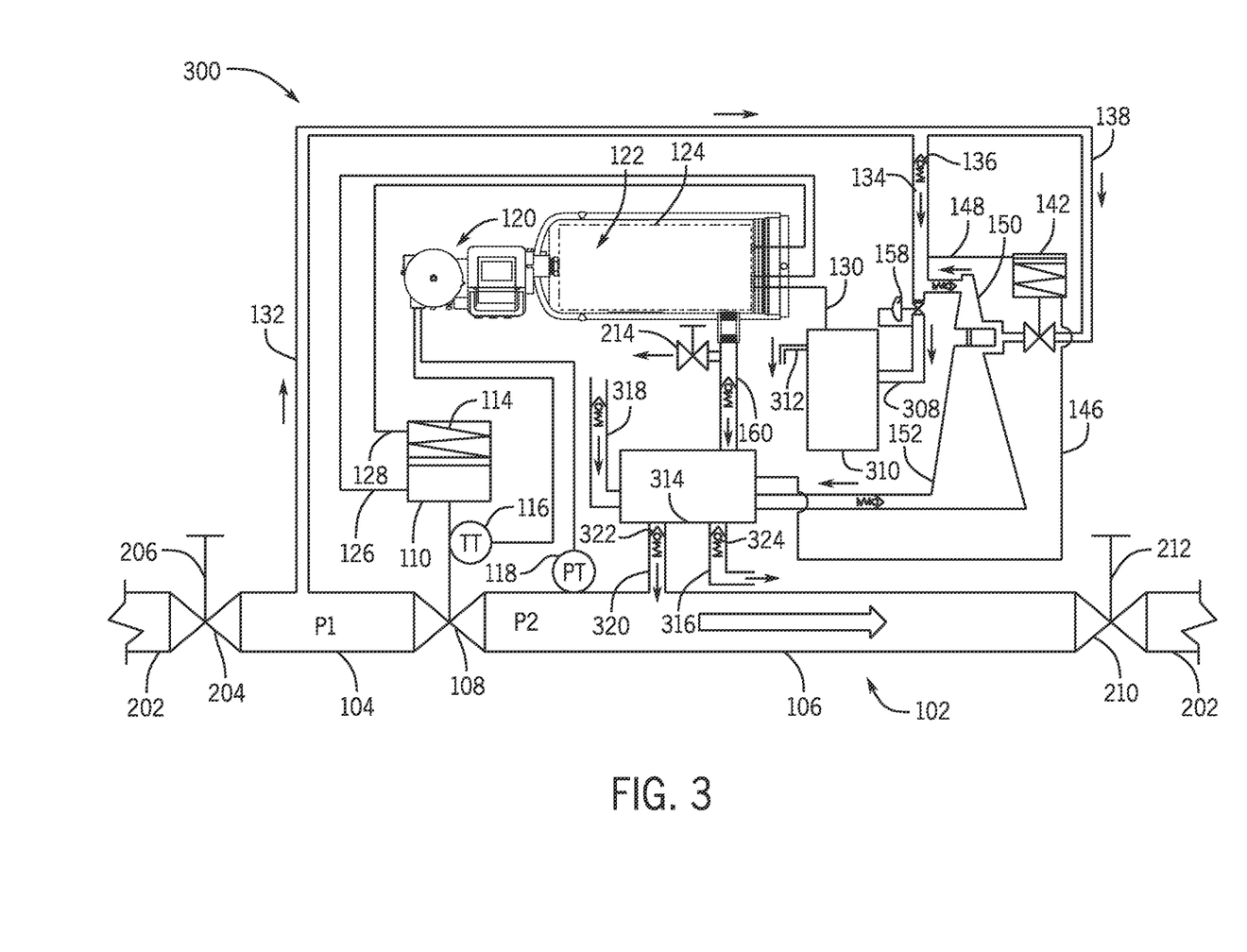
FIG. 3 is a schematic view of the pipeline of FIG. 1 including yet another configuration of the example control system.

FIG. 3 illustrates another example of a fluid control system 300 that can be used pipeline 102 of FIG. 1 (e.g., as an alternative configuration of the fluid control system 100). As will be recognized, the fluid control system 300 shares a number of components in common with and operates in a similar fashion to the examples illustrated and described previously. For the sake of brevity, these common features will not be again described below in detail. Rather, previous discussion of commonly named or numbered features, unless otherwise indicated, also applies to example configurations of the control system 300.

In some examples, more than one control valve or other instruments may benefit from the high-pressure gas generated by the compressor 150. For example, a high-pressure tank 310 may be positioned on an output line 308 of the compressor 150. In particular, the high-pressure tank 310 may thus provide high-pressure gas to the input line 130 for operation of the instrument assembly 124 and subsequent reinjection into the pipeline 102. Further, the high-pressure tank 310 may also provide high-pressure gas to one or more remote control valves, instruments, or other pneumatic devices via output supply line 312 (e.g., for operation of other distant or alternatively located control systems, including for control of other pipeline valves).

In some examples, a similar arrangement can allow for common routing of lower pressure gas, including as can result from operation of various pneumatic control systems. For example, the one or more control valves, instruments, or other pneumatic devices mentioned previously (in addition to the chamber 122) may vent gas via vents 160, 318 into a low-pressure tank 314. The low-pressure tank 314 can then store the low-pressure gas as needed, and also vent the low-pressure gas to particular outlets. In one example, the low-pressure tank 314 may vent to either the downstream portion 106 of the pipeline 102 via a pipeline vent line 320 or to an alternate pressure sink via a vent line 316. In one example, the low-pressure tank 314 automatically determines the lowest pressure sink via check valves 322, 324.

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

Also as used herein, unless otherwise limited or defined, "substantially parallel" indicates a direction that is within ±12 degrees of a reference direction (e.g., within ±6 degrees), inclusive. For a path that is not linear, the path can be considered to be substantially parallel to a reference direction if a straight line between end-points of the path is substantially parallel to the reference direction or a mean derivative of the path within a common reference frame as the reference direction is substantially parallel to the reference direction.

Also as used herein, unless otherwise limited or defined, "substantially perpendicular" indicates a direction that is within ±12 degrees of perpendicular a reference direction (e.g., within ±6 degrees), inclusive. For a path that is not linear, the path can be considered to be substantially perpendicular to a reference direction if a straight line between end-points of the path is substantially perpendicular to the reference direction or a mean derivative of the path within a common reference frame as the reference direction is substantially perpendicular to the reference direction.

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Additionally, unless otherwise specified or limited, the terms "about" and "approximately," as used herein with respect to a reference value, refer to variations from the reference value of ±15% or less, inclusive of the endpoints of the range. Similarly, the term "substantially equal" (and the like) as used herein with respect to a reference value refers to variations from the reference value of less than ±30%, inclusive. Where specified, "substantially" can indicate in particular a variation in one numerical direction relative to a reference value. For example, "substantially less" than a reference value (and the like) indicates a value that is reduced from the reference value by 30% or more, and "substantially more" than a reference value (and the like) indicates a value that is increased from the reference value by 30% or more.

Also as used herein, unless otherwise limited or specified, "substantially identical" refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

The previous description of the disclosed embodiments is provided to enable any person skilled in the art to make or use the invention. Given the benefit of this disclosure, various modifications to these embodiments will be readily apparent to those skilled in the art, and the principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A fluid control system, comprising:
 a pipeline including a valve that defines an upstream portion and a downstream portion of the pipeline;
 one or more instruments configured to control operation of the valve;
 a compressor configured to selectively receive supply gas from the upstream portion of the pipeline via a supply line, and to provide pressurized supply gas to the one or more instruments; and
 an expander configured to selectively receive supply gas from the upstream portion of the pipeline via the supply line, the expander configured to power the compressor;
 wherein supply gas flows to the compressor and the expander via the supply line when a differential pressure between the upstream portion of the pipeline and a downstream portion of the pipeline is below a predetermined threshold.

2. The fluid control system of claim 1, wherein the fluid control system prevents flow of supply gas to the compressor and expander when the differential pressure is above the predetermined threshold.

3. The fluid control system of claim 2, wherein the fluid control system further comprises:
 a differential pressure regulator arranged to control flow of supply gas to the compressor and the expander.

4. The fluid control system of claim 1, further comprising:
 an input line that routes a flow of pressurized instrument gas from an output of the compressor to the one or more instruments at a predetermined pressure.

5. The fluid control system of claim 1, further comprising:
a bypass line arranged between the supply line and an input line;
wherein the fluid control system provides a flow of supply gas through the bypass line to the one or more instruments when a differential pressure between the upstream portion of the pipeline and a downstream portion of the pipeline is above a predetermined threshold.

6. The fluid control system of claim 1, wherein the one or more instruments are in fluidic communication with an actuator configured to operate the valve.

7. The fluid control system of claim 1, further comprising:
a pressurized chamber at a reference pressure greater than or equal to the pressure in the downstream portion of the pipeline;
wherein the one or more instruments are held within the pressurized chamber.

8. The fluid control system of claim 7, wherein the one or more instruments are arranged to release instrument gas to be captured within the pressurized chamber and reinjected into the downstream portion of the pipeline via a vent.

9. The fluid control system of claim 8, wherein the vent includes a vent valve, and wherein opening the vent valve changes the reference pressure of the pressurized chamber from the reference pressure to atmospheric pressure.

10. The fluid control system of claim 1, wherein high-pressure supply gas from an output of the compressor flows into a high-pressure tank arranged to supply the one or more instruments and one or more remote instruments.

11. The fluid control system of claim 1, wherein low-pressure supply gas from an output of the expander flows into a low-pressure tank, and wherein low-pressure instrument gas from one or more remote instruments flows into the low-pressure tank.

12. The fluid control system of claim 11, wherein the low-pressure tank is in fluid communication with a plurality of pressure sinks and is configured vent to a lowest-pressure sink of the plurality of pressure sinks via one or more check valves.

13. A fluid control system, comprising:
a pipeline including a valve defining an upstream portion and a downstream portion of the pipeline; and
a supply line connected to the upstream portion of the pipeline, the supply line configured to provide supply gas to one or more instruments configured to control the valve;
wherein the supply line is configured to provide supply gas to a compander when a differential pressure between the upstream portion and the downstream portion of the pipeline is below a predetermined threshold, the compander being arranged to provide pressurized supply gas to the one or more instruments; and
wherein the supply line is configured to directly provide supply gas to the one or more instruments via a bypass line when the differential pressure is above the predetermined threshold.

14. The fluid control system of claim 13, wherein flow of supply gas to the compander is controlled by a regulator.

15. The fluid control system of claim 13, wherein pressurized supply gas from an output of the compander flows to the one or more instruments at a predetermined pressure via an input line.

16. The fluid control system of claim 13, wherein the one or more instruments are held within a pressurized chamber, and wherein the pressurized chamber provides a reference pressure to the one or more instruments that is greater than or equal to the pressure in the downstream portion of the pipeline.

17. The fluid control system of claim 16, wherein instrument gas released by the one or more instruments is captured within the pressurized chamber and reinjected into the downstream portion of the pipeline via a vent.

18. The fluid control system of claim 13, wherein high-pressure supply gas from an output of the compander flows into a high-pressure tank, and wherein the high-pressure tank supplies high-pressure instrument gas to the one or more instruments and one or more remote instruments.

19. A method of controlling flow through a pipeline via a valve that defines an upstream portion and a downstream portion of the pipeline, the method comprising:
selectively directing supply gas from the upstream portion of the pipeline via a supply line to a compressor and an expander configured to power the compressor, the compressor thereby operating to provide pressurized supply gas to one or more instruments, and the one or more instruments operating with the pressurized supply gas to control operation of the valve;
wherein supply gas is directed to the compressor and the expander via the supply line when a differential pressure between the upstream portion of the pipeline and a downstream portion of the pipeline is below a predetermined threshold.

20. The method of claim 19, further comprising:
selectively directing supply gas to the one or more instruments via a bypass line that bypasses the compressor and the expander;
wherein supply gas is directed to the one or more instruments via the bypass line when the differential pressure is below the predetermined threshold.

* * * * *